United States Patent Office 3,467,518
Patented Sept. 16, 1969

3,467,518
PHOTOCHEMICAL CROSS-LINKING OF POLYMERS
Urbain Leopold Laridon and Gerard Albert Delzenne, Wilrijk, Belgium, and Helmut Mäder and Hans Ulrich, Leverkusen, Wolfgang Himmelmann, Cologne-Stammheim, and Bernhard Seidel, Cologne-Mulheim, Germany, assignors to Gevaert-Agfa N.V., Mortsel, Belgium, a Belgian company
No Drawing. Filed June 14, 1965, Ser. No. 471,509
Claims priority, application Great Britain, June 15, 1964, 24,762/64
Int. Cl. G03c *1/70, 5/00*
U.S. Cl. 96—35.1                           15 Claims

ABSTRACT OF THE DISCLOSURE

A process is disclosed in which a soluble polymeric material carrying groups which are reactive with intermediates derived from the photochemical decomposition of azidosulfonyl groups is selectively insolubilized by exposing to actinic light selective portions of a photosensitive mixture containing the polymer and a minor amount of a compound containing two azidosulfonyl groups. Among the suitable soluble polymeric materials are polymers containing hydroxyl groups, pyridine groups, styrene groups, N-vinyl pyrrolidone groups, and the like. The process is especially useful in photography and in photomechanical reproduction processes. The insolubilizing (cross-linking) azidosulfonyl agents can be made from various aliphatic, aromatic, and heterocyclic and polysulfonic acids by reacting the acid chlorides of these polysulfonic acids with sodium azides.

---

The present invention relates to a process for photochemically decreasing the solubility of polymers, to the production of printing plates, and to printing plates obtained by this process.

The light-sensitivity of polycarboxylic acid azides and their use in the reproduction field has been described. Thus when a soluble polymeric material carrying hydroxyl groups, amino groups or thiol groups is mixed with a minor amount of a polycarboxylic acid azide, the latter under the influence of actinic light rays induces cross-linking of the polymeric material to the insoluble state.

It is an object of the present invention to provide a new class of photochemical cross-linking agents. Another object is to provide improved photographic layers containing these new photochemical cross-linking agents. Still another object is to provide improved photographic resist materials and printing plates for lithography and other related processes. Other objects will become apparent from the following description and examples.

The process for the photochemical cross-linking of polymers in accordance with the invention comprises exposing to actinic light selected portions of a photosensitive mixture, which mixture essentially consists of a soluble polymeric material carrying groups which are reactive with intermediates deriving from the photochemical decomposition of azidosulfonyl groups and of a minor amount of a compound containing at least two azidosulfonyl groups.

The soluble polymeric material forming the main composition of the photosensitive mixture carries groups which are reactive with intermediates derived from the photochemical decomposition of azidosulfonyl groups. Among these reactive groups are especially of value hydroxyl groups, pyridine groups, phenyl groups, lactam groups, etc. These reactive groups may be substituted directly on the main polymeric chain as well as on side chains.

The polymeric material carrying the reactive groups may be a natural polymer, a chemically modified natural polymer, a synthetic polymerization, polycondensation or polyaddition product.

Among the natural polymers carrying hydroxyl groups may be mentioned cellulose, starch, dextrin and the like, and their partial esters and ethers as long as they still possess in their structure a substantial amount of free hydroxyl groups capable of reacting with intermediates derived from the photochemical decomposition of azidosulfonyl groups, such as the hydroxyethyl and hydroxypropyl derivatives of cellulose and starch.

Synthetic polymerization products which can be cross-linked according to the process of the invention are butyl rubber, poly(vinyl alcohol), partly acetalized or esterified poly(vinyl alcohol), poly(vinylpyridine), poly(vinylpyrrolidone) and copolymers comprising in their polymeric structure a substantial amount of styrene, vinyl alcohol, vinylpyridine or vinylpyrolidone. When the synthetic polymerization product is a copolymer, the comonomer or comonomers may be chosen among styrene and its nuclear substituted derivatives, vinyl chloride, vinylidene chloride, vinyl esters, vinyl ethers, acrylic and methacrylic acid esters, acrylonitrile, methacrylonitrile, butadiene, and the like. These comonomers are worked up in the synthetic polymerization product in order to provide to the copolymers a maximum of strength and hardness after exposure to light and cross-linking.

In the same way a certain amount of plurality unsaturated monomeric groups may be present in the copolymer, such as divinylbenzene, digylcol diacrylates, N,N'-alkylene-bis-acrylamides and -methacrylamides, N-allyl- and N-methallyl acryamides, N,N-diallylacrylamide, ethylene diacrylate and triallyl cyanurate provided that the photosensitive layer remains soluble when not affected by actinic light.

Synthetic condensation polymers carrying free hydroxyl groups are for instance polyamides carrying hydroxymethyl or hydroxyethyl substituents, and epoxy resins such as the polyether obtained by the polycondensation of 2,2-bis-(4-hydroxyphenyl)-propane with epichlorohydrin.

As photochemical cross-linking agents are added to the above enumerated polymeric materials minor amounts of compounds containing at least two azidosulfonyl groups.

Under the influence of light these compounds containing at least two azidosulfonyl groups are probably decomposed into compounds containing sulfonylnitrene radicals. In this way a disulfonyldiazide represented by the formula

will be converted by actinic light rays into a disulfonylnitrene of the formula

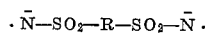

which immediately will react with the reactive groups of the polymeric material present and cross-link the latter to the insoluble state.

The above reaction scheme is only given by way of explanation of what really occurs when the photosensitive mixture of the invention is exposed to actinic light rays. The invention, however, is independent of the real reaction which occurs and of whatever the mechanism of cross-linking may be.

For facility's sake the compounds containing at least two azidosulfonyl groups will be referred to hereinafter as polysulfonylazides. These polysulfonylazides which are useful as light-sensitive cross-linking agents according to the invention can be manufactured from a large list of aliphatic, aromatic, and heterocyclic polysulfonic acids by reacting, according to known methods, the acid chlorides of these polysulfonic acids with sodium azide.

As aliphatic disulfonyldiazide may be used for instance the diazide of 1,4-butanedisulfonic acid.

Among the azides of aromatic disulfonic acids may especially be mentioned the diazides of benzene- and toluene-dicarboxylic acids such as 1,3-benzenedisulfonylazide and their derivatives such as toluene-2,4-disulfonylazide and 4-amino-6-chloro-m-benzene-disulfonylazide. Azides of disulfonic acids having in their structure two phenyl groups are also valuable such as 4,4'-biphenyldisulfonylazide, 4,4'-oxy-dibenzenesulfonylazide, 4,4'-methylene-dibenzenesulfonylazide, 4,4'-dichloro-biphenyl-2,6'-disulfonylazide and 4,4'-dichloro-biphenyl-3,5'-disulfonylazide.

Among the azides of naphthalene disulfonic acids may be mentioned 1,5-naphthalene-disulfonylazide, 2,6-naphthalene-disulfonylazide and 2,7-naphthalene-disulfonylazide.

The relative proportions of the polymeric material and the photochemical cross-linking agent may be varied as desired or as conditions may require, but ordinarly the proportions thereof in the mixture will be within the range of about 99 to about 75% of the former to about 1 to about 25% of the latter by weight.

Of course, the ideal concentration of the polysulfonylazide will be dependent on the polysulfonylazide used, on the thickness of the photosensitive layer and on the destination of the photo-insolubilized layer. In each individual case the optimum concenrtation can be determined by trial and error.

Cross-linking of the polymer can be effected to some extent by simply subjecting the mixture of the polymer and of the polysulfonylazide to a source of actinic light rays. However, in order to obtain the optimum degree of insolubilization and a faster reaction, it is preferred to effect the reaction in the presence of catalytic amounts of activating dyes. Among these may be mentioned Michler's ketone and analogues, 4H-quinolizine-4-one, certain naphthothiazolines and pyrazolines and the like.

In the process of the present invention the polysulfonyl-azide photochemical cross-linking agents can be used in combination with polycarboxylic acid azides; instead of such a mixture of polysulfonylazides and of polycarbozylic acid azides, also compounds containing both carbonyl azide substituents and sulfonyl azide substituents may be used.

The polymeric materials may be exposed to actinic light from any source and of any type. The light source should preferably, although not necessarily, furnish an effective amount of ultraviolet radiation. Suitable sources of light include carbon arcs, mercury vapor lamps, fluorescent lamps, argon glow lamps, photographic flood lamps and tungsten lamps.

For initiating the photochemical cross-linking by means of the polysulfonylazides a very strong light source is not needed. Indeed, in most of the examples described hereinafter, a 80 watt Philips mercury vapour lamp, placed at a distance of about 15 cm. of the surface to be polymerized, is used. Brighter light sources are generally not needed since at these relatively low light intensities the photochemically cross-linking influence of the polysulfonylazides according to the invention is found to be strong enough.

In the photochemical insolubilization of polymeric materials with polysulfonylazides high temperatures are not needed. The exposure, however, to strong light sources at a relatively short distance brings about a certain heating of the mass to be cross-linked, which heating favours the cross-linking rate.

It has been found that the mixture of polymeric material and of polysulfonylazides according to the invention is photosensitive, in the sense that its exposure to light causes its insolubilization. Thus, if a layer of one of such photosensitive mixture, initially soluble, is applied to a support and exposed photographically, the exposed areas become insoluble.

The invention is valuable for the formation of plates and films wholly made of the photosensitive mixture. The present process also makes possible the formation of coated printing films on any base by the deposition by any known proces of films or coatings of the photosensitive mixture. Typical bases are metal sheets (e.g. copper, aluminum, zinc, magnesium, etc.), paper, glass, cellulose ester film, poly(vinyl acetal) film, polystyrene film, polycarbonate film, poly(ethylene terephthalate) film, nylon and metal screens, etc.

The base or support is coated with a solution of the polymeric material in a suitable solvent, this solution containing dissolved or homogeneously dispersed therein, a photochemically cross-linking polysulfonylazide whereupon the solvent or solvent mixture is eliminated by known means such as evaporation, leaving a more or less thin coating of the photosensitive mixture upon the base or support. Thereafter the dried photosensitive coating is exposed to actinic light rays.

When the support material carrying the photosensitive composition is light-reflecting, there may be present, e.g. superposed on said support and adherent thereto or in the surface thereof, a layer or stratum absorptive of actinic light such as to minimize reflectance from the combined support of incident actinic light.

If the photosensitive composition is water-soluble, water may be used as solvent in coating the support. On the contrary, if water-insoluble photosensitive compositions are used, organic solvents, mixtures of organic solvents or mixtures of organic solvents and water may be used.

The plates formed wholly of or coated with the photosensitive composition are useful in photogratphy, photomechanical reproduction processes, lithography and intaglio printing. More specific examples of such are offset printing, silk screen printing, duplicating pads, manifold stencil sheeting coatings, lithographic plates, relief plates, and gravure plates. The term "printing plates" as used in the claims is inclusive of all of these.

As compared with the polycarbonylazides, the polysulfonylazides possess a better thermal stability. Indeed, the polycarbonylazides generally decompose between 70 and 120° C. whereas the thermal decomposition of the polysulfonylazides begins only between 120 and 140° C. Consequently these products offer the advantage of being less influenced by thermal decomposition so that sharper images are obtained. The greater stability appears also from the fact that an etheric solution of 1,4-phenylene diazide, as is known from the U.S. patent specification 2,852,379, already after a few hours loses a part of its activity as light-sensitive cross-linking agent, whereas the comparable 1,3-phenylenedisulfonylazide as such is stable for a long time and keeps its light-sensitivity and ability for cross-linking.

The manufacture of polysulfonylazides in general is more easier than the manufacture of other aromatic compounds containing azido groups, since they can be obtained by a one-step method starting from aromatic sulfonylchlorides and sodium azide.

A specific application of the invention is illustrated by a typical preparation of a printing plate. In this application a plate, usually of metal, is coated with a film of the photosensitive composition. When the plate is not of metal, it may consist wholly of the photosensitive composition or it may be coated with a film thereof. In all these cases, the surface of the plate is then exposed to light through a contacted process transparency, e.g. a process positive or negative (consisting solely of opaque and transparent areas and where the opaque areas are of the same optical density, viz. the so-called line or half-tone negative or positive). The light induces the reaction which insolubilizes the areas of the surface beneath the transparent portions of the image, whereas the areas beneath the opaque portions of the image remain soluble. The soluble areas of the surface are then removed by a developer, and the insoluble raised portions of the film which remain can serve as a resist image, while the exposed base material is etched, forming a relief plate, or the plate can be inked and used as a relief printing plate directly in the customary manner.

After washing away the non-exposed and thus soluble parts of the layer or film, the polymer parts made insoluble by exposure moreover may be subjected to other known hardening techniques. Of course, these hardening techniques will depend upon the kind of the light-sensitive polymeric composition. When e.g. the original polymer is an epoxy resin of 2,2-bis (4-hydroxyphenyl)-propane and epichlorohydrin, the insolubilized polymer part remaining after exposure and development can still be hardened supplementarily according to known techniques for epoxy resins.

The purpose of this additional hardening is to strengthen the insolubilized polymer parts as much as possible. If e.g. the remaining insolubilized polymer surface is to be used as a printing plate, a suchlike subsequent hardening often is desirable.

The thickness of the photosensitive layer is a direct function of the thickness desired in the relief image and this will depend on the subject being reproduced and particularly on the extent of the non-printing areas. In the case of half-tones the screen is also a factor. In general, the thickness of the photosensitive layer will vary from about 0.001 mm. to about 7 mm. Layers ranging from about 0.001 to about 0.70 mm. in thickness will be used for half-tone plates. Layers ranging from about 0.25 to about 1.50 mm. in thickness will be used for the majority of letterpress printing plates, including those wherein half-tone and line images are to be combined.

The solvent liquid used for washing or "developing" the printing plates made from the photosensitive composition must be selected with care, since it should have good solvent action on the unexposed areas, yet have little action on the hardened image or upon the base material, the non-halation layer, or the subbing layer with which the photosensitive composition may be anchored to the support.

The photosensitive compositions of the invention show many advantages over the known photosensitive compositions. Since the cross-linking agent is independent of the polymeric material, the latter can be selected in view of the desired application; e.g. when the photosensitive composition is to be applied to a metal support, the polymeric material can be selected from polyvinylbutyrals and polyepoxy resins, of which the great adhesivity to metals is known.

Further, the solubility of the starting material and also the solvent which will be used to "develop" the photographic image can be adapted to the final destination of the photochemically cross-linked polymeric material. A still further advantage of the present photosensitive compositions is that they can be prepared a considerable time before use.

The photosensitive cross-linking compositions are suitable for other purposes in addition to the printing uses described above, e.g. as ornamental plaques or for producing ornamental effects; as patterns for automatic engraving machines, foundry molds, cutting and stamping dies, name stamps, relief maps for braille, as rapid cure coatings, e.g. on film base; as sound tracks on film; for embossing plates, paper, e.g. with a die prepared from the photopolymerizable compositions; in the preparation of printed circuits; and in the preparation of other plastic articles.

The photosensitive cross-linking initiators of the invention can be used as ultraviolet curing catalysts for systems where low heat is a requirement in the curing of a particular part, and sunlight or other source of ultraviolet light are readily available.

The following examples illustrate the present invention.

EXAMPLE 1

(A) Preparation of toluene-2,4-disulfonylazide

In a 250 cc. flask fitted with a stirrer and dropping funnel 3 g. of sodium azide are dissolved in 30 cc. of water. The solution is cooled to 5–10° C. while stirring, whereupon a solution of 5 g. of toluene-2,4-disulfonyl chloride in 30 cc. of acetone is added dropwise. Then stirring is continued for 15 minutes. A white precipitate is formed which is sucked off, washed with water and recrystallized from 50 cc. of ethanol. The product is dried in vacuum. Melting point: 93° C.

(B) Photochemical cross-linking

A solution of the following composition:

Polyether of 2,2-bis(4-hydroxyphenyl)-propane and
 epichlorohydrin (intrinsic viscosity: 0.47 dl./g.
 measured at 25° C. in sym - tetrachloro-
 ethane) _____g__   0.1
Toluene-2,4-disulfonylazide _____g__   0.01
Michler's ketone _____g__   0.002
Methylene chloride _____cc__  3
Sym-tetrachloroethane _____cc__  2 is coated in the dark onto an aluminum foil in such a way that after drying a layer of approximately 5μ thickness is obtained. The layer is exposed for 4 min. through a negative to an 80 watt Philips mercury vapour lamp placed at a distance of 15 cm. Then the layer is developed in a mixture of methylene chloride and sym-tetrachloroethane (50:50). A good image is obtained.

EXAMPLES 2–6

The disulfonylazides listed in the table below are prepared analogously to that of Example 1(A). Each of said disulfonylazides is then employed in the same way as in Example 1(B) as photochemical cross-linking agent in a layer coated on an aluminum foil. After exposure and development as in Example 1(B) the results listed in the following table are obtained.

| Example | Disulfonylazide | Melting point, °C. | Exposure time required, min. |
|---|---|---|---|
| 2 | 1,3-benzene-disulfonylazide | 83 | 8 |
| 3 | 4-amino-6-chloro-m-benzene-disulfonylazide | 163 | 5 |
| 4 | 4,4 oxy-dibenzenesulfonylazide | 40 | 6 |
| 5 | 4,4-methylene-dibenzenesulfonylazide | 57 | 4 |
| 6 | 1,4-butane-disulfonylazide | 86 | 2 |

EXAMPLES 7–12

A solution of the following composition is prepared:

Poly-4-vinylpyridine _____g__   0.1
Disulfonylazide _____g__   0.01
Michler's ketone _____g__   0.002
Methylene chloride _____cc__  3
Sym-tetrachloroethane _____cc__  2

This solution is coated onto an aluminum foil, exposed to light and developed as described in Example 1(B). The exposure time needed to give a good image with different disulfonylazides is given in the following table.

| Example | Disulfonylazide | Exposure time required, min. |
|---|---|---|
| 7 | 1,3-benzenedisulfonylazide | 3 |
| 8 | 4-amino-6-chloro-m-benzenedisulfonylazide | 2 |
| 9 | 4,4'-diphenyl-disulfonylazide | 6 |
| 10 | 4,4'-oxy-di-benzenesulfonylazide | 2 |
| 11 | 4,4'-methylene-di-benzenesulfonylazide | 1½ |
| 12 | 1,4-butane-disulfonylazide | 3 |

EXAMPLE 13

To a solution of 6 g. of poly(N-vinylpyrrolidone) in 100 cc. of a mixture of equal parts of methanol and methylene chloride a solution is added of 0.12 g. of 1,3-benzenedisulfonylazide and 0.03 g. of Michler's ketone in chloroform. This mixture of solutions is applied to a cleaned zinc plate as a layer of 5–7µ thickness and after drying for some minutes exposed for 1 min. to a carbon arc lamp of 15 a. at 45 v. placed at a distance of 25 cm. behind a half-tone original. After development by means of cold or warm water (methanol or chloroform can be used as well) a sharply-edged relief is obtained on the exposed areas, whereas on the non-exposed areas the zinc plate is free of any coating. If the development is carried out with a solution of methylviolet in methanol, immediately a coloured relief is obtained. Colouring in the same way can be performed after development as well.

EXAMPLE 14

Example 13 is repeated but with a copper plate as a base and with a coating solution containing in addition 0.12 g. of diphenyl-4,4'-disulfonylazide in chloroform and a little dimethylformamide. After coating, exposure and development the same result is obtained as in Example 13.

EXAMPLE 15

Example 13 is repeated but use is made as a cross-linking agent of 0.12 g. of naphthalin-1,5-disulfonylazide dissolved in a mixture of chloroform and dimethylformamide. After coating, exposure and development the same result is obtained as in Example 13.

EXAMPLE 16

Example 13 is repeated but use is made as a cross-linking agent of 0.15 g. of naphthalene-2,7-disulfonylazide. After coating, exposure and development the same result is obtained as in Example 13.

EXAMPLE 17

To a solution of 8 g. of poly(N-vinylpyrrolidone) in 80 cc. of chloroform are added under yellow light 0.32 g. of benzene-1,3-disulfonylazide and 0.06 g. of Michler's ketone. By means of a doctor knife this mixture is applied to a very fine-meshed nylon fabric (100 meshes per cm.) which has been cleaned carefully and pretreated with anisol. The solution dries within few seconds. After exposure behind a half-tone original and development as described in Example 13, a pattern is obtained which is suited for screen-printing.

EXAMPLE 18

In a mixture of xylene and chloroform (1:1) 4 g. of butyl rubber are dissolved whilst slightly heating. To this solution 0.15 g. of diphenyl-4,4'-disulfonylazide and 0.03 g. of Michler's ketone in a little chloroform and dimethylformamide are added. The mixture is applied as a thin coating to a copper printing plate. After a short drying period this material is exposed in contact with a half-tone or screen transparency as described in Example 1 and developed for 2 min. in a mixture of chloroform and a little xylene. After drying the obtained negative pattern of the original can be used as such or after colouring with methyl violet as an etching resist of the copper plate for etching by means of iron (III) chloride solutions.

Onto a zinc plate a firmly adhering layer of the same properties is obtained. The uncovered areas of the plate can be etched with nitric acid.

EXAMPLE 19

To a solution of 5 g. of polystyrene (average molecular weight: 300,000) in 100 cc. of a mixture of xylene and methylene chloride (1:1) are added under yellow light 0.02 g. of Michler's ketone and 0.30 g. of benzene-1,3-disulfonylazide in a little chloroform. This solution is applied to a zinc plate as a thin layer and exposed as described in Example 13. After development with a mixture of chloroform and xylene (1:1) a clear negative relief image of the used original is obtained.

EXAMPLE 20

To a solution of 6 g. of a copoly(styrene/N-vinylpyridine) (average molecular weight: 50,000) in 80 cc. of chloroform is admixed under yellow light a solution of 0.05 g. of Michler's ketone and 0.3 g. of benzene-1,3-disulfonylazide in 20 cc. of chloroform. This mixture is applied to a zinc plate as a thin coating and after drying exposed as described in Example 13. After development in a mixture of ethyl acetate and butyl acetate (1:1), on the exposed areas a negative image of the original is obtained in the form of a solid smooth coating. The uncovered areas of the zinc plate can then be etched to any depth with dilute nitric acid without impairing the etching resist. The cross-linked layer can previously be coloured at will with a solution of methyl violet in ethanol.

EXAMPLE 21

An amount of 6 g. of a copoly(styrene/methylmethacrylate) (average molecular weight 50,000) prepared according to the specifications of German patent application 1,143,706 is dissolved, sensitised and admixed to 1,3-benzene-disulfonylazide as cross-linking agent as described in Example 20. After coating therewith a copper sheet on a base of laminated paper and exposing as described in Example 13, development is carried out for 2 min. in a mixture of butyl acetate and methanol (1:2). A negative image of the original is obtained in the form of a relief on the support, which after an appropriate etching, e.g. with iron (III) chloride solution can be used for printed circuits.

EXAMPLE 22

Example 17 is repeated but with 0.4 g. of 4,4'-dichlorodiphenyl-2,2'-disulfonylazide as a cross-linking agent and with 0.08 g. of Michler's ketone as a sensitiser. The same result is obtained as in Example 17.

EXAMPLE 23

Example 13 is repeated, but as cross-linking agent 0.3 g. of 4,4' - dichlorodiphenyl - 3,3' - disulfonylazide dissolved in chloroform is used. After coating ,exposure and processing, the same result is obtained as in Example 13.

What we claim is:
1. Process for the photochemical cross-linking of polymers which comprises exposing to actinic light selected portions of a photosensitive mixture essentially consisting of a solvent soluble polymeric material carrying groups which are reactive with intermediates derived from the photochemical decomposition of azidosulfonyl groups and of a minor amount of a compound containing two azidosulfonyl groups.

2. Process for the photochemical cross-linking of polymers according to claim 1, wherein the soluble polymeric material carrying groups which are reactive with intermediates derived from the photochemical decomposition of azidosulfonyl groups is taken from the group consisting of natural and synthetic polymers carrying free hydroxyl groups.

3. Process for the photochemical cross-linking of polymers according to claim 2, wherein the soluble polymeric material is a polyether obtained by the polycondensation of 2,2 - bis(4 - hydroxyphenyl)-propane and epichlorohydrin.

4. Process for the photochemical cross-linking of polymers according to claim 2, wherein the soluble polymeric material is polyvinylbutyral containing a substantial amount of free hydroxyl groups.

5. Process for the photochemical cross-linking of polymers according to claim 1, wherein the soluble polymeric material carrying groups which are reactive with intermediates derived from the photochemical decomposition of azidosulfonyl groups, is a polymeric material carrying pyridine groups.

6. Process for the photochemical cross-linking of polymers according to claim 5, wherein the soluble polymeric material carrying pyridine gorups is poly(vinylpyridine).

7. Process for the photochemical cross-linking of polymers according to claim 1, wherein the soluble polymeric material carrying groups which are reactive with intermediates derived from the photochemical decomposition of azidosulfonyl groups is polystyrene or a copolymer containing a substantial amount of styrene groups.

8. Process for the photochemical cross-linking of polymers according to claim 1, wherein the soluble polymeric material carrying groups which are reactive with intermediates derived from the photochemical decomposition of azidosulfonyl groups is poly(N-vinylpyrrolidone).

9. Process for the photochemical cross-linking of polymers according to claim 1, wherein the compound contaning two azidosulfonyl groups is 4,4' - methylene-dibenzene-sulfonylazide.

10. Process for the photochemical cross-linking of polymers according to claim 1, wherein the compound containing two azidosulfonyl groups is 1,4 - butane-disulfonylazide.

11. Process for the photochemical cross-linking of polymers according to claim 1, wherein the compound containing two azidosulfonyl groups is 1,3 - benzenedisulfonylazide.

12. Process for the photochemical cross-linking of polymers according to claim 1, wherein the compound containing two azidosulfonyl groups is taken from the group consisting of 4,4' - diphenyldisulfonylazide, 4,4'-dichlorodiphenyl - 2,6' - disulfonylazide and 4,4'-dichlorodiphenyl-3,5'-disulfonylazide.

13. Process for the photochemical cross-linking of polymers according to claim 1, wherein the compound containing two azidosulfonyl groups is taken from the groups consisting of 1,5-, 2,6- and 2,7-naphthalene disulfonylazide.

14. Process for producing resist images by the photochemical cross-linking of a polymeric material, wherein a photographic element is exposed to actinic light through a process transparency, said photographic element comprising a support having thereon a photosensitive layer essentially comprising a solvent soluble polymeric material carrying groups which are reactive with intermediates derived from the photochemical decomposition of azidosulfonyl groups, and a minor amount of a compound containing two azidosulfonyl groups whereby in the exposed areas said polymeric material is cross-linked to the insoluble state, and removing the soluble photosensitive composition in the unexposed areas, thereby forming a photographic resist image.

15. Process for producing a photographic printing plate by the photochemical cross-linking of a polymeric material, wherein a photographic element is exposed to actinic light through a process transparency, said photographic element comprising a support having thereon a photosensitive layer essentially comprising a solvent soluble polymeric material carrying groups which are reactive with intermediates deriving from the photochemical decomposition of azidosulfonyl groups, and a minor amount of a compound containing two azidosufonyl groups, whereby in the exposed areas said polymeric material is cross-linked in the insoluble state, and removing the soluble polymeric material in the unexposed areas, thereby forming a photographic printing plate.

References Cited

UNITED STATES PATENTS

| 2,518,249 | 8/1950 | Ott | 260—349 |
| 2,948,610 | 8/1960 | Merrill et al. | 96—33 |
| 3,058,944 | 10/1962 | Breslow et al. | 260—41 |
| 3,143,423 | 8/1964 | Reynolds et al. | 96—91 |
| 3,203,936 | 8/1965 | Breslow et al. | 260—79.3 |
| 3,261,785 | 7/1966 | Robinson | 260—2.5 |
| 3,278,305 | 10/1966 | Laridon et al. | 96—35.1 |
| 3,301,841 | 1/1967 | Burleigh et al. | 260—94.4 |
| 3,345,171 | 10/1967 | Laridon et al. | 96—36 |

OTHER REFERENCES

Hackh, I.: "Chemical Dictionary," third edition, 1944, p. 817.

NORMAN G. TORCHIN, Primary Examiner

RONALD H. SMITH, Assistant Examiner

U.S. Cl. X.R.

96—91, 115